United States Patent
Raanan

(12) 
(10) Patent No.: US 8,244,853 B1
(45) Date of Patent: Aug. 14, 2012

(54) METHOD AND SYSTEM FOR NON INTRUSIVE APPLICATION INTERACTION AND DEPENDENCY MAPPING

(75) Inventor: Gil Raanan, Zoran (IL)

(73) Assignee: VMware, Inc., Palo Alto, CA (US)

( * ) Notice: Subject to any disclaimer, the term of this patent is extended or adjusted under 35 U.S.C. 154(b) by 2437 days.

(21) Appl. No.: 10/792,410

(22) Filed: Mar. 3, 2004

Related U.S. Application Data

(60) Provisional application No. 60/451,788, filed on Mar. 3, 2003, provisional application No. 60/451,797, filed on Mar. 3, 2003, provisional application No. 60/451,795, filed on Mar. 3, 2003.

(51) Int. Cl.
*G06F 15/16* (2006.01)
*G06F 15/177* (2006.01)

(52) U.S. Cl. ........................... 709/224; 715/734

(58) Field of Classification Search ............... 715/734; 709/223, 224, 225, 228, 229; 700/28; 707/1
See application file for complete search history.

(56) References Cited

U.S. PATENT DOCUMENTS

| | | | |
|---|---|---|---|
| 5,276,789 A | 1/1994 | Besaw et al. | |
| 5,432,932 A | 7/1995 | Chen et al. | |
| 5,655,081 A | 8/1997 | Bonnell et al. | |
| 5,761,502 A | 6/1998 | Jacobs | |
| 6,046,988 A | 4/2000 | Schenkel et al. | |
| 6,138,122 A | 10/2000 | Smith et al. | |
| 6,286,047 B1 | 9/2001 | Ramanathan et al. | |
| 6,336,138 B1 | 1/2002 | Caswell et al. | |
| 6,370,681 B1 | 4/2002 | Dellarocas et al. | |
| 6,393,386 B1 | 5/2002 | Zager et al. | |
| 6,900,822 B2 | 5/2005 | Germain et al. | |
| 2002/0097253 A1 | 7/2002 | Charisius et al. | |
| 2002/0133541 A1 | 9/2002 | Sturtevant et al. | |
| 2003/0144746 A1* | 7/2003 | Hsiung et al. | 700/28 |
| 2003/0195861 A1* | 10/2003 | McClure et al. | 707/1 |

FOREIGN PATENT DOCUMENTS

EP  0 733 966 B1  8/2004

* cited by examiner

*Primary Examiner* — Paul H Kang

(57) ABSTRACT

The present invention facilitates mapping dependencies between software applications, components, and business processes on a computer network. Packets communicated between software applications are sampled to identify characteristics of the packet. The characteristics are used to identify communicating applications and to generate dependency maps of software applications on a computer network.

12 Claims, 12 Drawing Sheets

| Time Start | Time Stop | Application | Verb | Files | Servers | DBs | Networks | Errors | Users |
|---|---|---|---|---|---|---|---|---|---|
| 12:00 | 13:00 | Purchase-101 | Buy | /server/prices/list-2003 | 201.3.3.18 | Oracle-"sys11" | 201.3.3.* | 50% | /group108/* |
| 12:00 | 13:00 | Purchase-101 | Login | None | 201.3.3.18 | None | 201.3.3.* | 1% | /group108/* |
| 12:00 | 13:00 | Purchase-101 | Logout | None | 201.3.3.18 | None | 201.3.3.* | 0.01% | None |
| 12:00 | 14:38 | Siebel_121 | Get_Customer_ID | None | 201.1.12.204 201.2.13.112 | None | 201.12.* 201.2.12.* | .02% | * |

Figure 9

METHOD AND SYSTEM FOR NON INTRUSIVE APPLICATION INTERACTION AND DEPENDENCY MAPPING

RELATED APPLICATIONS

This application claims priority to U.S. Provisional Application No. 60/451,788 filed on Mar. 3, 2003, entitled, "Method and System for Classification of HTTP Data by Applications," which is hereby incorporated herein by reference in its entirety; and to U.S. Provisional Application No. 60/451,797, filed on Mar. 3, 2003, entitled, "Method and System for Non Intrusive Applications Interactions and Dependencies Mapping," which is hereby incorporated herein by reference in its entirety; and to U.S. Provisional Application No. 60/451,795 filed on Mar. 3, 2003, entitled, "Method and System for Application Flows and Business Process Discovery," which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to computer network and application monitoring. More specifically, it relates to mapping dependencies between components in a networked environment.

In networked computer environments, applications and services are often comprised of multiple components operating on multiple devices. This is particularly true for large enterprises that may occupy multiple geographical locations. For example, a customer relationship manger or CRM system may utilize components such as a database, a web server, and user application, each executing on a different computer or network device. The devices may be connected through a LAN or a WAN. An example of such a prior art networked computer environment may be seen FIG. 1. Various business applications 100 utilize software applications 102, which in turn may be distributed across various pieces of hardware 104.

In networked environments, application components may communicate using a variety of protocols. For example, components may communicate through remote procedure call (RPC), common object request broker architecture (CORBA), remote method invocation (RMI), Internet interoperability protocol (IOP), common gateway interface (CGI), hypertext transfer protocol (HTTP), or many other TCP/IP based protocols.

For a network administrator or owner of an enterprise computer network it is important to have an understanding of how different entities interact within the computer network. Utilizing such knowledge allows a network administrator to see which components are under-utilized and which are over-utilized. In addition it allows the administrator to plan for adding additional components or removing old ones. An administrator could view ways of optimizing the network for performance or efficiency. Additionally, knowledge of application dependencies allows an administrator to anticipate possible effects of changes in one piece of the network towards various applications.

Understanding how entities and components within a network interact is often a cumbersome job. It often involves installing monitoring agents on multiple devices that run the components. Understanding how entities and components within a network interact also often involves the manual task of inspecting the configuration of each application to gather information of utilized resources and components.

There is a need for systems and methods to automatically and non-intrusively discover the dependencies between applications on a network.

SUMMARY OF THE INVENTION

It is an object of the present invention to provide systems and methods for mapping dependencies between applications, components, and business processes on a computer network.

In some embodiments, the present invention provides systems and methods for identifying dependencies between applications in a computer network. A packet communicated between applications on a computer network is sampled. The characteristics of the packet are identified. The characteristics of the packet are used to identify the communicating software applications and to dynamically generate a map of dependencies between software applications.

In some embodiments, the present invention provides systems and methods for identifying dependencies between applications in a computer network. Included are software applications connected via a computer network. Included, also is a dependency mapping module. The dependency mapping module is programmed to sample packets communicated between software applications. Furthermore, the dependency mapping module is programmed to identify characteristics of the packets. Furthermore, the dependency mapping module is programmed to use the characteristics to identify the applications on a computer network and to dynamically generate a map of dependencies between the software applications.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 9 is a diagram of a data structure in accordance with an embodiment of the invention;

DETAILED DESCRIPTION OF THE PREFERRED EMBODIMENT

Embodiments of the present invention are now described in detail with reference to the drawings in the figures. As described in more detail, the present invention provides systems and methods for automatically and non-intrusively mapping dependencies between application components on a computer network or between applications on a network.

Furthermore, the present invention provides systems and methods for identifying packets transmitted on a network in order to associate the packets with communications between applications and application components.

In addition, the present invention identifies business processes and the components on which those processes depend. For example, an enterprise accounting system may utilize email, fileservers, databases, web servers and other software components. One of the goals of the present invention is to discover such dependencies. Other business processes may include CRM, sales, marketing, human resources, financial or other services provided by a business.

Mapping dependencies between applications, services, components and business processes provides a view of shared resources on the network. Understanding the interaction of resources and applications is important for the success of many networked enterprises, particularly those providing web services and grid computing. Dependency mapping provides network administrators and other users with a tool to understand how applications or other components interact. Specifically, it provides insight into how applications share resources, which applications read and write data to other applications and what resources are shared among one or more applications. For example, dependency mapping can how application servers utilize databases, which application servers utilize which databases and which databases are shared among multiple application servers. By understanding interdependencies between software components and applications, a network administrator or other user can understand how, for example, resources in one data center interact with other components in the same data center or with resources in other data centers.

Figure 1:
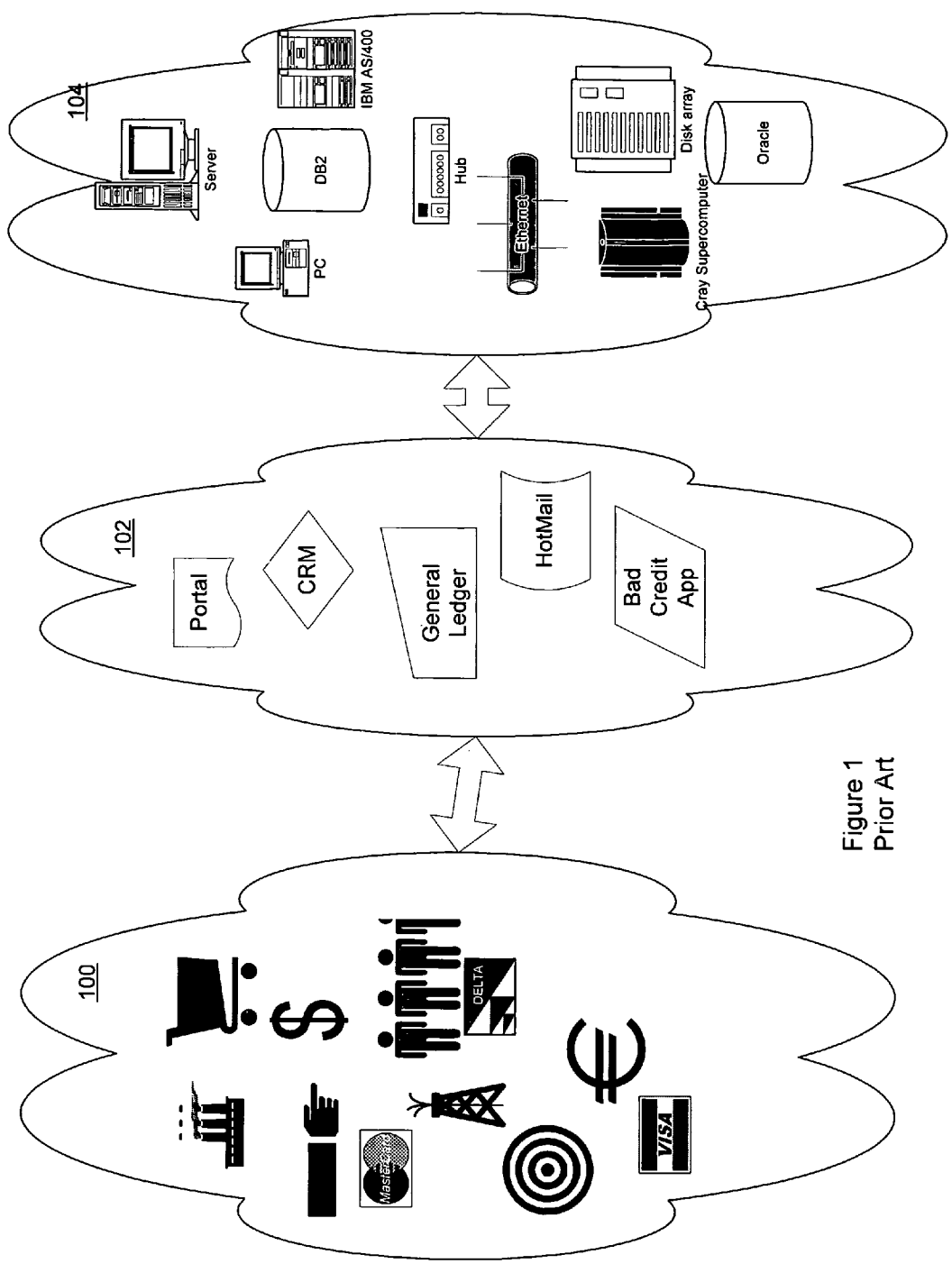
FIG. 1 is a conceptual block diagram of interconnections between applications, components and hardware.
Figure 2:
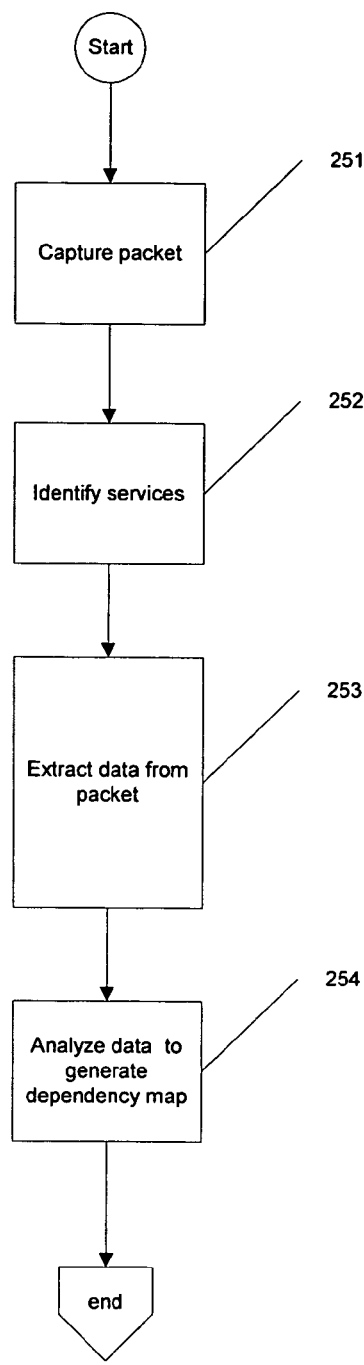
FIG. 2 is a flow chart illustrating a method for creating an application dependency map in accordance with an embodiment of the invention.

FIG. 2 illustrates one method for identifying dependencies between applications. A packet is captured at step 251. As discussed herein, a packet is captured by sampling traffic on a network. The packet is identified at step 252. The identification may include the communicating applications, services, components or business processes, the type of communication, the reason for the communication, or other identifying criteria or characteristics. In addition, the process of identification may include one of the identification schemes discussed herein below. In step 253 data is extracted from the packet that will aid in identifying dependencies. This may include packet characteristics such as application type, verb/action performed by the packet, user who originated or received the packet, network device information, and other information. The information extracted from the packet is used to dynamically generate a dependency map of applications, components, services, and business processes, step 254.

Figure 2A:
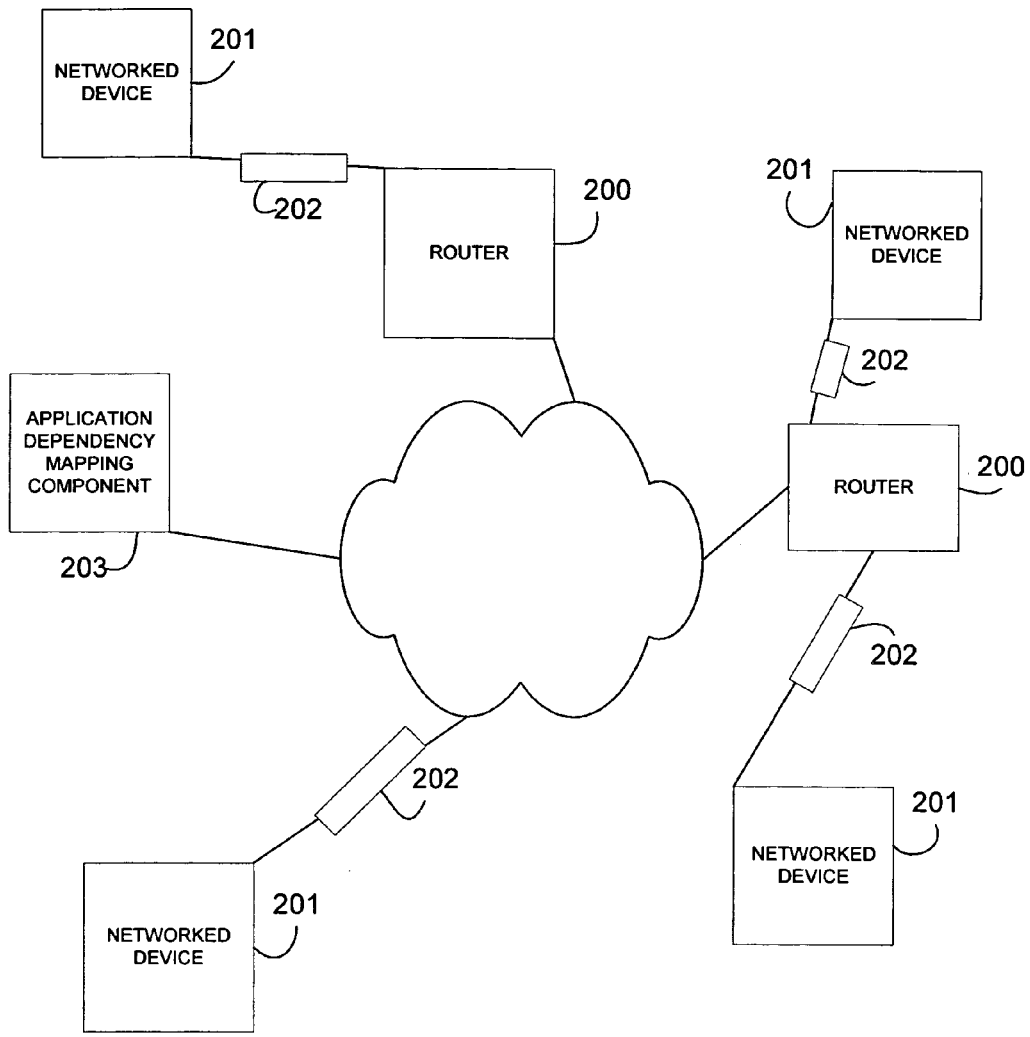
FIG. 2A is a block diagram of a computer network in accordance with an embodiment of the invention.

FIG. 2A illustrates an exemplary computer network. Devices 201 attached to the network may be computers, workstations, servers, printers, databases, handhelds or any device capable of connecting to a communication network. Devices 201 are linked to one another through routers 200. The routers 200 may also be gateways, hubs, switches, bridges or any device capable of linking elements on a communication network. Devices 201 and routers 200 transmit packets 202 on the communication network. Applications may execute on network devices 201. Exemplary applications are databases, email servers, application servers, web services, and other applications as known in the art.

Attached to the network is an application dependency mapping component 203, an example of which is the nLayers System from nLayers Inc. of San Jose, Calif. The application dependency mapping component 203 may be attached to a specific device in the network 201, or to a router 200, or may be connected independently. The application dependency mapping component 203 may execute on any network device including workstations, servers, routers, switches, hubs or bridges. In addition, in some embodiments, the components of the application dependency mapping component 203 may be divided among multiple networked devices. For example, multiple application dependency mapping components 203 may exist on multiple network segments and aggregate their results. In other embodiments, different components of the application dependency mapping component 203 may be distributed to different devices and communicate with each other over the network.

The application dependency mapping component 203 discovers dependencies between applications and other applications or components, or between business processes and applications or components.

Figure 3:
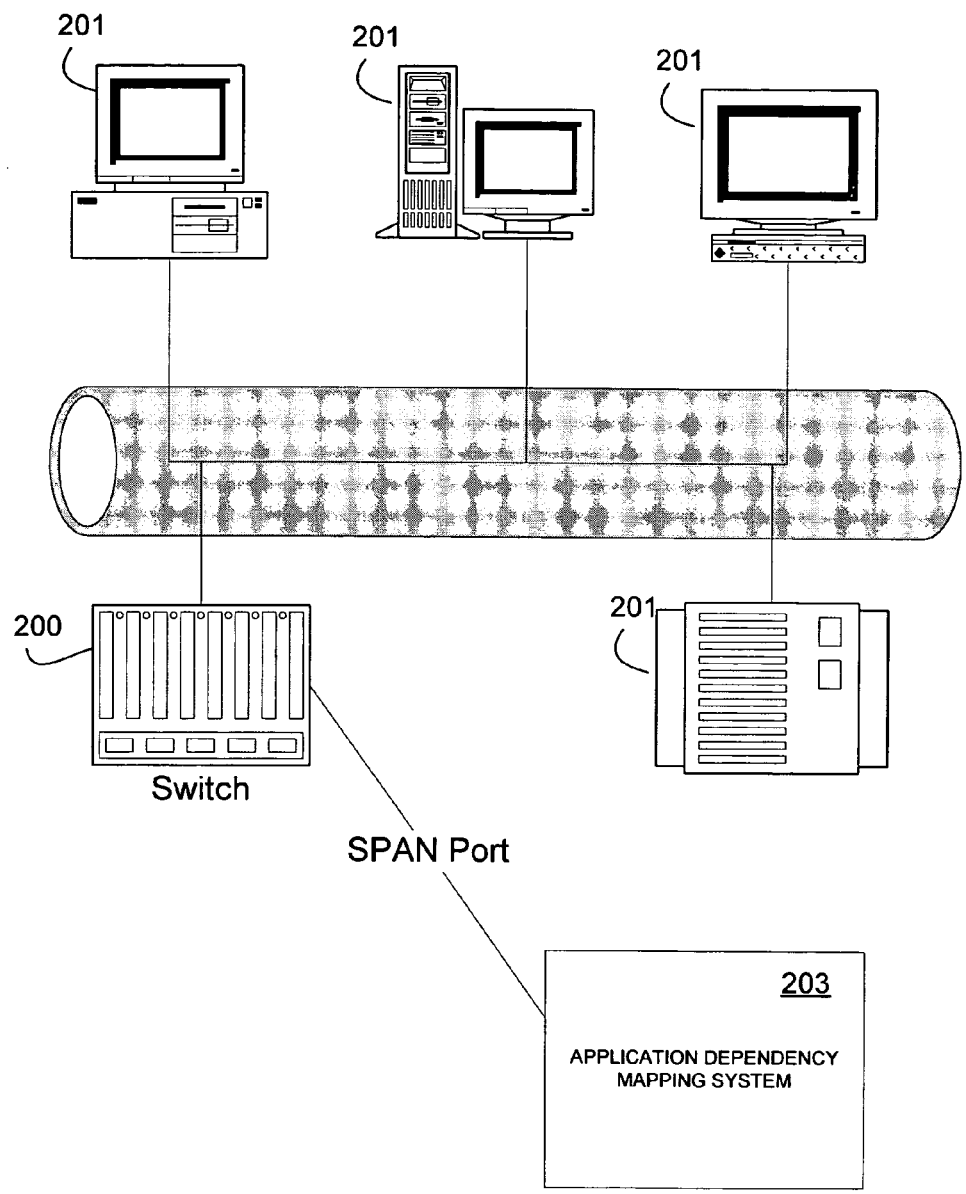
FIG. 3 is a block diagram of a computer network in accordance with an embodiment of the invention.

The application dependency mapping component 203 collects packets on the network, non-intrusively through sampling. The application dependency mapping component 203 does not require additional components to be installed on existing system resources. For example, existing routers, hubs, switches, and servers do not require installation of dedicated dependency mapping components nor do they require a change in how they operate. Rather, packets are viewed by the dependency mapping component 203 through sampling traffic on the network. Traffic is monitored and certain packets are collected by the dependency mapping component 203 for further inspection. Not collecting all packets on the network allows for higher efficiency operation and can provide an accurate picture of the network without having to process all the packets on the network In order to monitor the traffic on the network and to sample packets on the network, the application dependency mapping component 203 must be attached to the network in a location that provides a view of all potential traffic. In some embodiments, illustrated in FIG. 3, the application dependency mapping component 203 could be connected to the SPAN port on a network switch. By doing so the application dependency mapping component 203 can monitor all traffic that travels through a switch to which it is connected.

Figure 4:
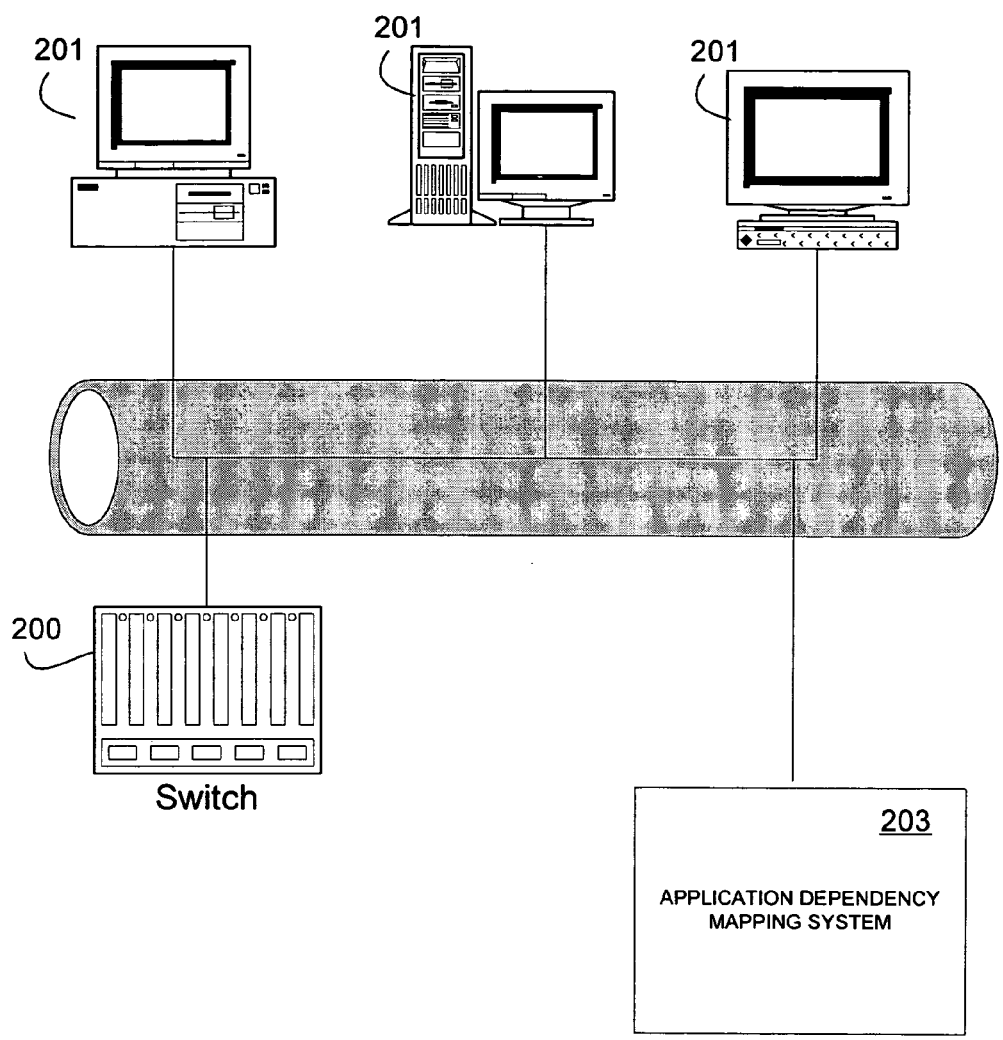
FIG. 4 is a block diagram of a computer network in accordance with an embodiment of the invention.
Figure 5:
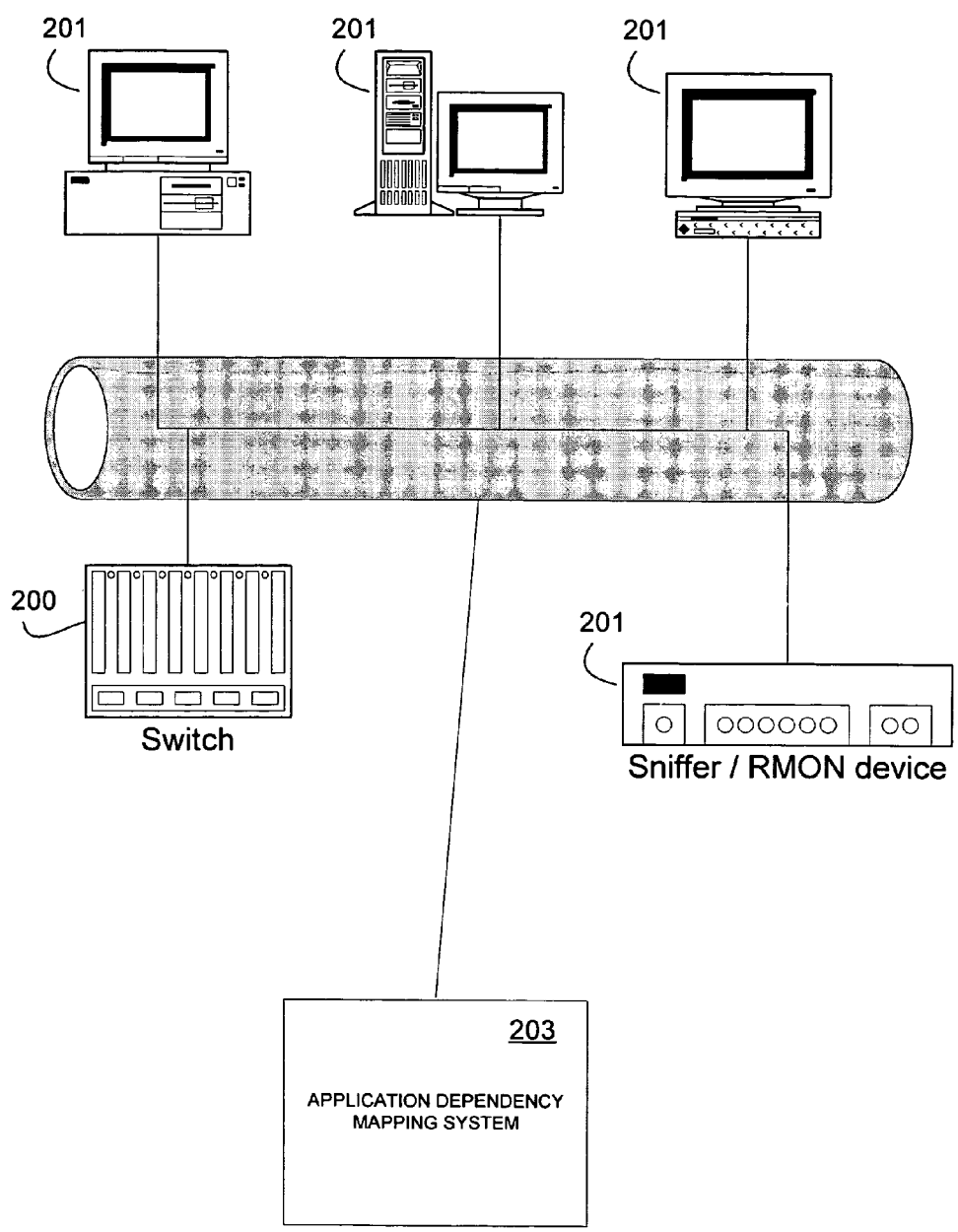
FIG. 5 is a block diagram of a computer network in accordance with an embodiment of the invention.

In other embodiments, illustrated in FIGS. 4 and 5, the application dependency mapping component 203 could execute on a device with a promiscuous mode network interface. As it is known in the art, a promiscuous mode network interface is capable of viewing all traffic on a network segment to which it is connected. An application dependency mapping component 203 executing on a device with a promiscuous mode network interface would need to be attached to a network segment that has a view of all network traffic, or a portion of network traffic that it is required to handle. In some embodiments, multiple application dependency mapping components 203 are attached to various segments so that each segment can be viewed by at least one application dependency mapping component 203. In that embodiment the application dependency mapping components 203 would aggregate their data. In addition, in some embodiments, the application dependency mapping component 203 could receive information from network management systems.

Figure 6:
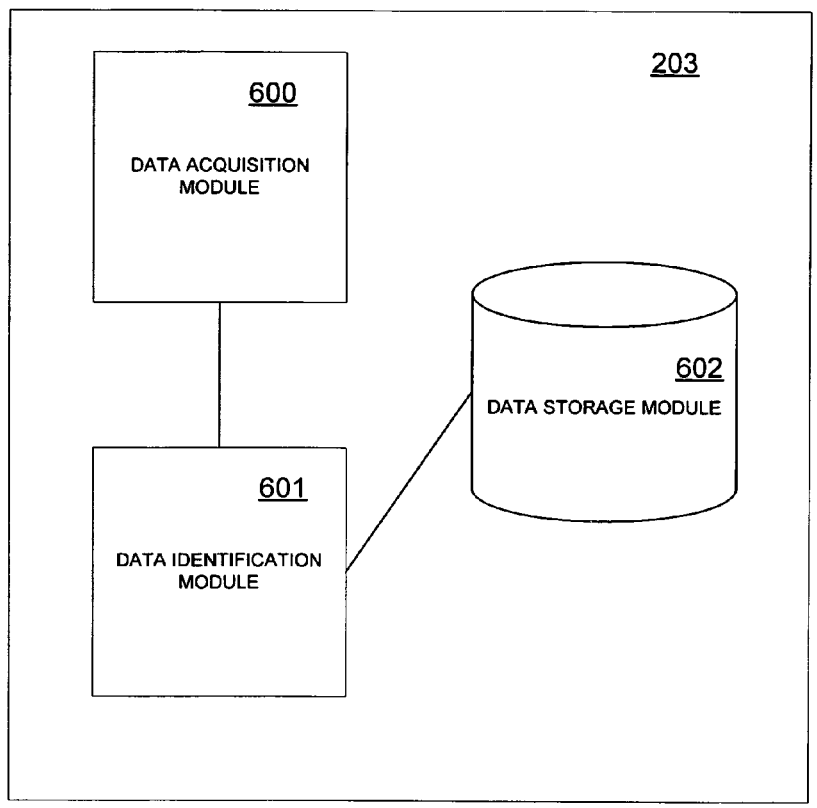
FIG. 6 is a block diagram of an application dependency mapping component in accordance with an embodiment of the invention.

FIG. 6 presents a view of various components within an application dependency mapping component 203. The application dependency mapping component 203 collects packets on the network using a data acquisition module 600. The data acquisition module 600 monitors the traffic on a network and samples packets. Packets 202 can be inspected and utilized without having to reconstruct entire TCP sessions. This reduces overhead and increases speed. The sampling, in some embodiments, is random In some embodiments, a user can set the sampling parameter (N), so that on average one out of every N packets is collected or sampled. In other embodiments, other algorithms may be used that sample every Nth packet, or other sampling algorithms may be used.

As further described herein, sampled packets are identified with the data identification module 601. The data identification module 601 analyzes sampled packets and uses characteristics of those packets to determine dependencies between applications. The packets can be analyzed using various mechanisms, described herein. If the data identification module 601 finds no important information then the packet is discarded. If the packet contains useful information the data storage module 602 may store the packet.

Data identification module 601 identifies the originating application of the data packet and the destination application. In addition, data identification module 601 identifies what type of action is being taken between the applications. Furthermore, data identification module 601 attempts to discover which business processes utilize which services, modules, and applications on the network. For example, data identification module 601 could identify that an application server depends on two fileservers, a web server, and a database.

Data identification module 601 identifies a packet based on data in the packet or types of fields in the packet. The identification could recognize certain characteristics of packets as belonging specifically to communication from a particular application type or brand of application, such as a database or an Oracle database. The identification may look at characteristics of packets or packet payloads, such as headers, field names, field values, patterns in the packet, keywords in the packet, signatures, regular expression matching, IP addresses, host names, data payload, or mime types.

Figure 7:
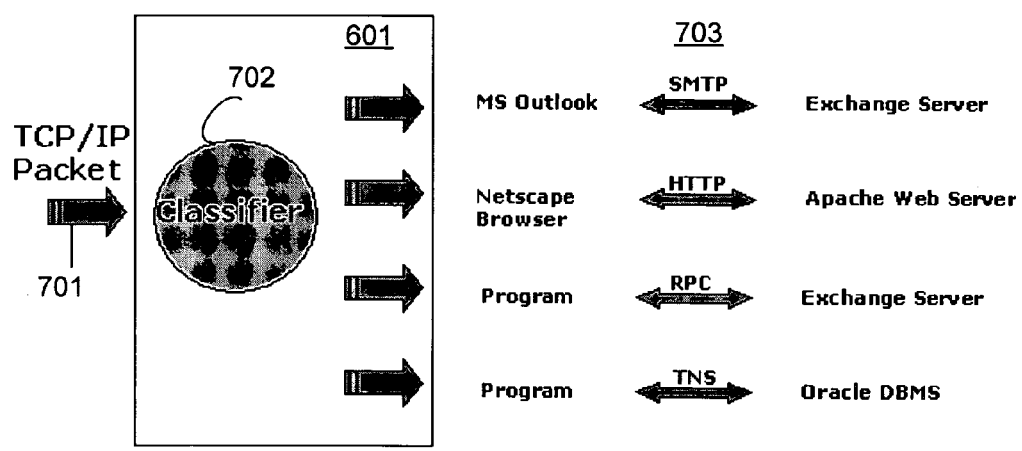
FIG. 7 is a block diagram of data identification module in accordance with an embodiment of the invention.

FIG. 7 illustrates, generally, how a data identification module 601 may operate, according to one embodiment. A TCP/IP packet 701 enters into the module and is passed to classifier 702. Classifier 702 parses the packet and identifies the two applications involved in transmitting the packet and the protocol used in transmission 703. Application identification is based on small differences in the characteristics of packets of similar application types. A fingerprint that uniquely identifies a packet as being of a certain type can be constructed from those small differences. A fingerprint can be constructed from characteristics of packets and packet payloads such as headers, field names, field values, patterns in the packet, keywords in the packet, signatures, regular expression matching, IP addresses, host names, data payload, or mime types. For example, a BEA application server communicating with an Oracle database would have a different fingerprint from an IBM application server communicating with an oracle database. Similarly, an email server communicating with an oracle database would have a different fingerprint from the previous two.

In some embodiments, packet classification is accomplished through examples determined by a group of users or administrators or by an individual. The individual may look at common packet types and define fingerprints for specific application types or specific application to application communication. The fingerprint could, in some embodiments, comprise a group of fields in a packet or patterns of data which uniquely or sufficiently define a particular type of communication. The fingerprints are then, in some embodiments, used to define rules that a packet may then be compared against to perform identification.

In some embodiments, a central knowledge base contains communication and packet fingerprints. A data identification module 601 periodically downloads fingerprints or rules from the knowledge base to aid in packet identification. Packets to be identified are examined by extracting relevant parameters or characteristics from the packet, such as fields or data patterns, and comparing the parameters or characteristics to a fingerprint stored in the knowledge base. In some embodiments, a rules engine is used to sequentially process identification rules until one is triggered, causing a positive packet identification.

Figure 8:
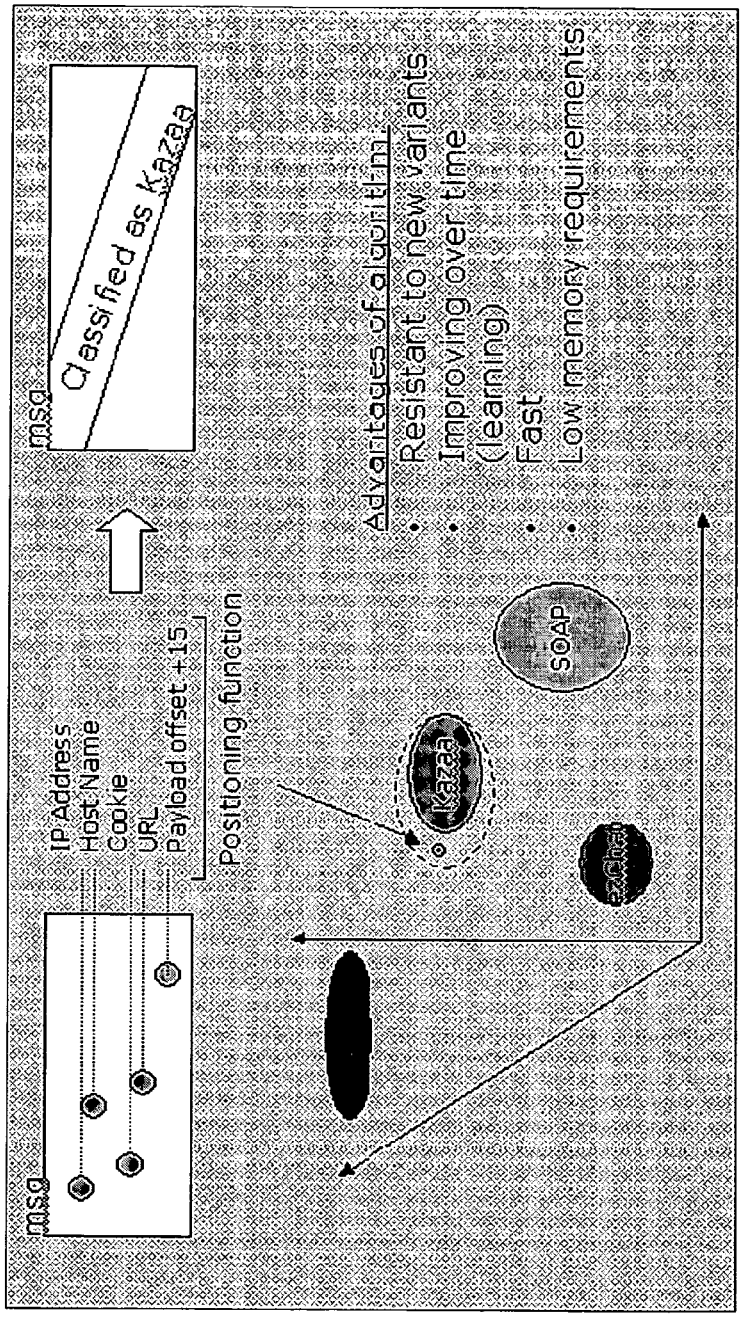
FIG. 8 is a conceptual diagram of a K Nearest Neighbor algorithm in accordance with an embodiment of the invention.

In other embodiments, a packet is identified through a K Nearest Neighbor protocol (KNN), as illustrated in FIG. 8. Standard packet types are defined using already identified or canonical packets. For, example, a canonical packet could be a packet known to be a communication between a BEA application server and an oracle database. The KNN algorithm takes a given number (C) of characteristics of each canonical packet type and extracts them. A positioning function converts those characteristics into coordinates in a graph with C axes. For example, a field in the packet header, the first byte of the packet payload and the length of the packet may uniquely identify each canonical packet type. In this example C would equal 3 and each canonical packet type would be plotted on a graph with 3 axes. Packet P entering the system is inspected for the same C characteristics and plotted on the same C axes graph of canonical packets based on the positioning function. The distance from P to all the canonical packet types in the graph is calculated. The canonical packet to which P is closest will be the basis for identifying P and P will be considered to be of the same type as its nearest neighbor canonical packet. In other embodiments the KNN algorithm may be used with any number of axes and various types of positioning functions.

After data identification module 601 identifies a packet it may be stored by data storage module 602. As further described herein, the identified packets are used to dynamically construct dependency maps between components of applications on the system or the business processes that utilize various applications, components, and services. Further identification of packets allows the system to build maps over time regarding how components of applications are linked together and utilized over time.

In some embodiments the information may be stored in data structures that delineate certain relevant aspects of the communication. For example, a data structure may contain entries for:

Verb/Action—The action contained in a packet. This may be "PUT" or "GET" for an HTTP communication, or "Read," "Write," or "Delete" for SQL communication.

Error messages

Users—user Ids in in the packet.

Objects—Objects in the packet. For example, files, URLs, or database tables.

Network Segments—The network segments in the packet.

These metrics provide insight into how various components of the network are being utilized and how applications interact.

FIG. 9 illustrates one embodiment of the data structure used to store relevant information extracted from packets. The application dependency mapping component 203 develops a map of dependencies between applications using the "verb/action" data and data relating to the network infrastructure, such as IP address or subnet information. In some embodiments, other data extracted from packets may be used.

In some embodiments, the information in the data structures is used to build maps of dependencies between components, applications, business processes and services on the network. Continuously analyzing and dynamically updating the maps can develop a more accurate picture of component and application interaction and dependencies. In some embodiments, dependencies may be stored over time, showing what dependencies existed at particular times in the network. For example, a record could be kept of dependencies for a week showing how applications utilize other application differently during weekdays and weekends.

In some embodiments, dependencies may be stored as an N×N×T matrix that maps application services. In such a matrix cell (i,j,t) would store invocation from application_service(i) to application_service(j) at time t or resources shared by application_service(i) and application_service(j) at time t.

Figure 10:
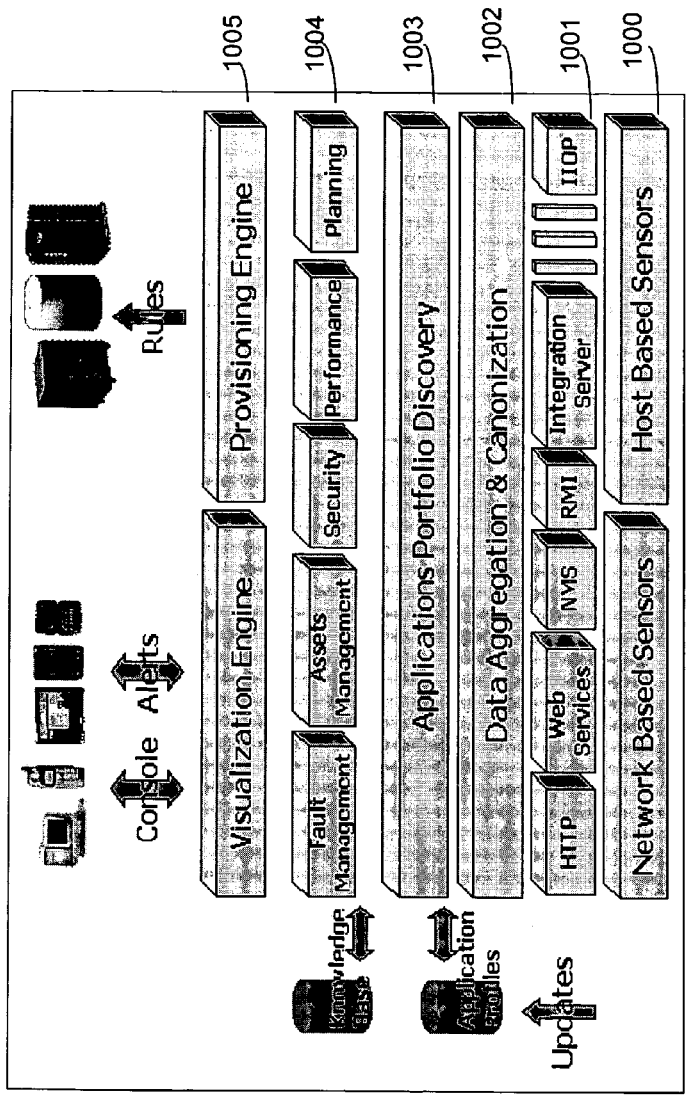
FIG. 10 is an architecture diagram of an application dependency mapping system in accordance with an embodiment of the invention.

FIG. 10 illustrates an exemplary architecture of an application dependency mapping component 203. The host based sensors and network based sensors at 1000 collect data from hosts and from the network. The protocols at 1001 represent different parsers to identify and collect application level information from the collected data. The data aggregation and canonization at 1002 normalizes data regarding different application types so that packets can be compared to canonical packet types. Applications portfolio discovery 1003 creates a coherent model of the data and packet types. The modules at 1004 provide specific functionality for specific data types. The visualization at 1005 provides a user interface into the system. The provisioning engine at 1005 provides for actions to execute if certain rules are triggered, events occur or conditions are met. In some embodiments, different combinations of the various components in FIG. 10 may be present or excluded. In addition, functionality may be grouped differently in different components. In some embodiments, components depicted in FIG. 10 may be combined or separated.

Figure 11:
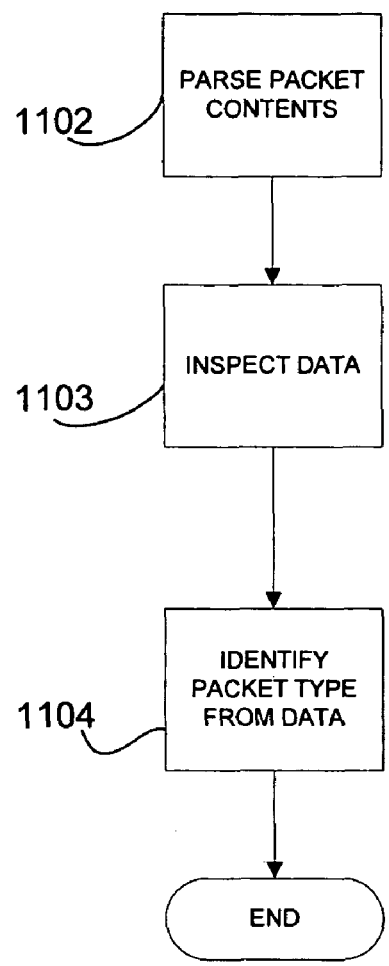
FIG. 11 is a flow chart illustrating one method for identifying a packet type in accordance with an embodiment of the invention.

FIG. 11 illustrates one method for packet identification and classification. The information contained in the packet is parsed, step 1102. The information parsed could be fields, field types, field values, the packet payload, or any information contained within the packet. In addition, this step may include looking at characteristics of the packet beyond the data contained within, such as length. The parsed data identifying a packet is inspected, step 1103. Data necessary to identify a packet as being of a certain type is analyzed. For example, if identification is based on packet length, header flags, and the first byte of the packet payload, then that data is inspected an analyzed. The packet is identified based on the inspected data, step 1104. The identification may be accomplished through a set of predetermined standard packet types, through a KNN algorithm, both as described above, or through another mechanism. Following the previous example, if the identification scheme is KNN, the three characteristics extracted from the packet are used to graph the packet along with canonical packet types on a 3 axes graph. The packet is identified as the type of the canonical packet type closest to the inspected packet on the graph.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

I claim:

1. A method for identifying dependencies between applications in a computer network, the method comprising:

sampling at least one data packet communicated between at least two software applications in a computer network;

identifying one or more characteristics of the at least one data packet; and using the one or more characteristics to identify one or more of the at least two software applications and dynamically generate a map of dependencies between the one or more software applications.

2. The method of claim 1 wherein the identifying one or more characteristics of the at least one data packet comprises comparing the at least one data packet to at least one packet fingerprint.

3. The method of claim 1 wherein the identifying one or more characteristics of the at least one data packet comprises using a K Nearest Neighbor algorithm.

4. The method of claim 1, wherein the using the one or more characteristics to identify one or more of the at least two software applications and dynamically generate a map of dependencies between the one or more software applications comprises maintaining one or more historical maps of dependencies between the one or more software applications over time.

5. The method of claim 1, wherein the using the one or more characteristics to identify one or more of the at least two software applications and dynamically generate a map of dependencies between the one or more software applications comprises identifying an action performed by the one or more of the at least two software applications.

6. The method of claim 1, wherein the map of dependencies between the one or more software applications comprises a map of dependencies between one or more business processes and the one or more software applications.

7. A system for identifying dependencies between applications in a computer network, the system comprising:

at least two software applications communicatively coupled via a computer network; and a dependency mapping module;

wherein the dependency mapping module is programmed to sample one or more packets communicated between the at least two software application;

wherein the dependency mapping module is programmed to identify one or more characteristics of the one or more packets; and wherein the dependency mapping module is programmed to use the one or more characteristics to identify one or more of the at least two software applications and dynamically generate a map of dependencies between the one or more software applications.

8. The method of claim 7, wherein the dependency mapping module is programmed to identify one or more characteristics of the one or more packets by comparing the at least one data packet to at least one packet fingerprint.

9. The method of claim 7, wherein the dependency mapping module is programmed to identify one or more characteristics of the one or more packets by using a K Nearest Neighbor algorithm.

10. The method of claim 7, wherein the dependency mapping module is programmed to maintain one or more historical maps of dependencies between the one or more software applications over time.

11. The method of claim 7, wherein the dependency mapping module is programmed to identify an action performed by the one or more of the at least two software applications.

12. The method of claim 7, wherein the map of dependencies between the one or more software applications comprises a map of dependencies between one or more business processes and the one or more software applications.

* * * * *